Patented May 3, 1932

1,856,796

UNITED STATES PATENT OFFICE

FRITZ STRAUB, HANS MAYER, AND WALTER ANDERAU, OF BASEL, SWITZERLAND, ASSIGNORS TO THE FIRM OF SOCIETY OF CHEMICAL INDUSTRY IN BASLE, OF BASEL, SWITZERLAND

AZO-DYESTUFFS CONTAINING CHROMIUM AND PROCESS OF MAKING SAME

No Drawing. Application filed August 21, 1928, Serial No. 301,164, and in Switzerland September 3, 1927.

The present invention relates to azo-dyestuffs containing chromium. It comprises the process of making these dyestuffs, the new dyestuffs themselves, and the material dyed with the new dyestuffs.

Known processes of making chromium compounds of dyestuffs containing groups which can be chromed involve the steps of treating at a raised temperature the dyestuff in aqueous solution or suspension in an acid, neutral or alkaline medium with an agent yielding chromium and then separating the dyestuff containing chromium by filtration and salting out, or partial evaporation and salting out, or by evaporation of the solution to dryness.

By the present invention chromium compounds of azo-dyestuffs containing groups capable of being chromed may be made by subjecting a mixture of the azo-dyestuff with a chroming agent to a baking process, for example, after the liquor containing the dyestuff in solution or in fine suspension in presence of the chroming agent has been evaporated to dryness. Before or during the evaporation partial chroming of the dyestuff may occur. The proportion of the dyestuff to the chroming agent and also the duration of baking may be selected as desired. Suitable additions of auxiliary substances may be made at any stage of the chroming process. When chromium salts of mineral acids are used, salts of organic acids or other suitable acids may be added for the purpose of binding the mineral acid, or as a buffer agent in any suitable proportion. Moreover, salts of inorganic acids, such as chloride of sodium, potassium or ammonium, ammonium sulfate or the like may also be added. Similar addition of the salts may be made by use of chromium salts of organic acids, such as chromium acetate or chromium formate or the like. In many cases it is advantageous to add to the mass to be baked further additions of a different nature, for instance glycerine.

Among other advantages of the new process are the shortened time of reaction; also the fact that the dyestuff, which, in consequence of its sensitiveness or liability to react, was not readily chromed by known methods, can now easily be chromed; the possibility of saving agents that yield chromium; the fact that the products are obtained directly in a form suitable for grinding. It could not be foreseen that the dyestuffs could sustain the high temperature to which they are exposed for the new process.

Under groups capable of being chromed the ortho-hydroxy-azo, the ortho-carboxy-azo, and the ortho-hydroxy-carboxy groupings are to be understood.

The dyestuffs which are particularly suitable for the above disclosed process are those which derive from ortho-hydroxy-diazo-compounds or from ortho-hydroxy- carboxylic acid. Among the dyestuffs of the first group those are particularly mentioned which contain the —CO—CH— group or which derive from the coupling components of the naphthalene series, such for example as the pyrazolones or the derivatives of the 2-amino-5-hydroxynaphthalene-7-sulfonic acid of the general formula

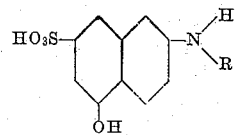

wherein R stands for H, alkyl, aryl, aralkyl or acidyl.

The following examples illustrate the invention, the parts being by weight:—

Example 1

The dyestuff, which is obtained by alkaline coupling of 19.8 parts of diazotized 5-nitro-4-chloro-2-aminophenol with 32.9 parts of 2-(4'-methyl)-phenylamino-5-hydroxynaphthalene-7-sulfonic acid of the formula

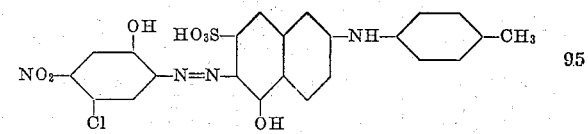

is dissolved or suspended, in the form of its sodium salt, in 6000 parts of hot water and there are added 15.6 parts of $Cr_2O_3$ in the form of a chromium acetate solution of 9 per cent. strength and 30 parts of glycerine; the whole is evaporated on the water-bath until it becomes a magma and the latter is heated for 24 hours at 160° C.

The mass has now solidified to a blackish-bronze cake which can easily be powdered. The powder dissolves sparingly in water to a blue solution and freely in dilute sodium carbonate solution or caustic soda solution to a greenish-blue solution. In concentrated sulfuric acid the chromium compound dissolves to a blue-violet solution. Cotton is dyed in a neutral or feebly alkaline bath greenish blue tints.

In a similar manner the azo-dyestuffs from diazotized 5-nitro-2-amino-1-phenol and 2-amino-5-hydroxynaphthalene-7-sulfonic acid, or N-phenyl or-xylyl derivatives thereof, may be converted into chromium compounds.

*Example 2*

35.65 parts of the dyestuff from diazotized para-chloraniline-meta-sulfonic acid and salicylic acid of the formula

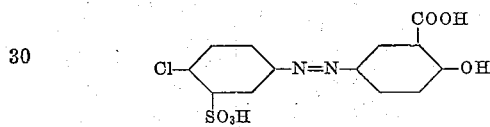

are dissolved in 500 parts of water, and mixed with a solution consisting of 7.6 parts of $Cr_2O_3$ in the form of potassium chromate, 13.2 parts of ammonium sulfate and 8.0 parts of sodium thiosulfate, followed by boiling. The whole is then evaporated to dryness on the steam bath and baked in the drying oven for several hours at 120-130° C. The dyestuff thus formed dyes wool from an acid bath yellow tints.

*Example 3*

45.4 parts of the dyestuff from diazotized 2-amino-1-phenol-4:6-disulfonic acid and 1-phenyl-3-methyl-5-pyrazolone of the formula

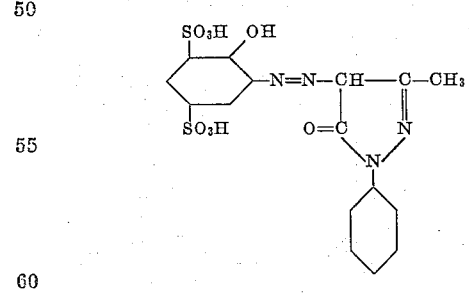

are dissolved in 500 parts of water and mixed with 11.4 parts of $Cr_2O_3$ in the form of chromium fluoride. The whole is then evaporated by boiling and baked in the dyeing oven for some hours at 120-130° C. The chromium compound thus obtained is easily soluble in water, and dyes wool in a solution acid with sulfuric acid clear orange shades.

*Example 4*

37.75 parts of the dyestuff from diazotized 4-chloro-2-aminophenol-6-sulfonic acid and β-naphthylamine of the formula

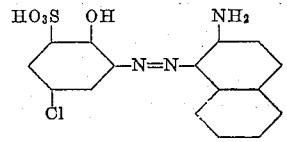

are dissolved in 2000 parts of water and boiled with a quantity of chromium formate corresponding to 11.4 parts of $Cr_2O_3$. The whole is then evaporated on the water bath and baked for some time at 105-110° C. The chromium compound thus obtained dyes wool in a bath acid with sulfuric acid blue-green tints.

In the same manner may inter alia be converted into the corresponding chromium compounds the dyestuffs from diazotized 4-nitro-2-aminophenol-6-sulfonic acid and acetoacetic anilide, diazotized 4-nitro-2-aminophenol and 1-amino-8-naphthol-3:6-disulfonic acid, diazotized 6-nitro-2-amino-1-phenol-4-sulfonic acid and β-naphthol, and diazotized 4-nitro-2-amino-1-phenol and resorcinol. Instead of chromium acetate chromium fluoride or chormium formate, with or without addition of sodium acetate, may be used, as well as also mixtures of the said salts.

The constitution of the chromium compounds of these dyestuffs is not known.

*Example 5*

A dye-bath is prepared with 2 parts of the chromium compound of the azo-dyestuff of Example 1 and 30 parts of Glauber's salt or 20 parts of common salt. 100 parts of cotton are entered at 60-70° C. and the bath is heated to boiling within ¼ hour and dyeing is continued for ½-¾ hour. Washing and drying follow as usual. Cotton is dyed blue tints of good properties of fastness.

*Example 6*

A dye-bath is prepared with 3 per cent. of sulfuric acid of 66° Bé. and the goods are handled in this bath at 60° C. for 10-15 minutes. The thoroughly dissolved chromium compound of the dyestuff from diazotized 5-nitro-2-amino-1-phenol and 2-amino-5-hydroxynaphthalene-7-sulfonic acid (6 per cent.) is now added and dyeing is continued for ½ hour at 60° C. The bath is then gradually heated to boiling and a further 5 per cent. of sulfuric acid of 66° Bé. is added and boiling continued for ½ to ¾ hour for fully developing the tint. A fast bluish-grey is produced.

Example 7

For 100 parts of ordinary or weighted silk 2 parts of the dyestuff of Example 1 are dissolved in the necessary quantity of boiling water. This solution and 6-8 parts of acetic acid are added to the dye-bath, the goods are entered at 50-60° C., the bath is gradually heated to 80° C. and kept at this temperature for ¾ to 1 hour. They are then washed in the usual manner, brightened and dried. The silk is dyed fast blue tints.

What we claim is:—

1. A process for the manufacture of azo-dyestuffs containing chromium by baking the dyestuffs capable of being chromed, with agents yielding chromium.

2. A process for the manufacture of azo-dyestuffs containing chromium by baking the dyestuffs capable of being chromed which are themselves obtained by coupling a diazo compound with a 2-amino-5-hydroxynaphthalene-7-sulphonic acid of the general formula

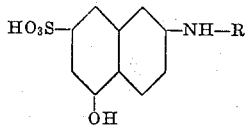

wherein R stands for H, one alkyl, aryl, aralkyl or acidyl radical, with agents yielding chromium.

3. A process for the manufacture of azo-dyestuffs containing chromium by baking the dyestuffs capable of being chromed, with agents yielding chromium in presence of alkali metal salts.

4. A process for the manufacture of azo-dyestuffs containing chromium by baking the dyestuffs capable of being chromed, with agents yielding chromium in presence of alkali metal salts and glycerine.

5. A process for the manufacture of azo-dyestuffs containing chromium by baking the dyestuffs capable of being chromed, with agents yielding chromium in presence of glycerine.

6. A process for the manufacture of an azo-dyestuff containing chromium by baking the dyestuff from diazotized 5-nitro-4-chloro-2-amino-1-phenol and 2-(4'-methyl)-phenylamino-5-hydroxynaphthalene-7-sulfonic acid, with chromium acetate in presence of glycerine.

7. As new products the azo-dyestuffs containing chromium which are obtained by baking dyestuffs containing groups capable of being chromed, with agents yielding chromium, which products, the constitution of which is not known, form dark powders, dyeing animal and vegetable fibres yellow to orange to redbrown to black to blue to blue-grey and greenish-blue tints.

8. As new products the azo-dyestuffs containing chromium which are obtained by baking dyestuffs containing groups capable of being chromed, which are themselves obtained by coupling a diazo compound with a 2-amino-5-hydroxynaphthalene-7-sulfonic acid of the general formula

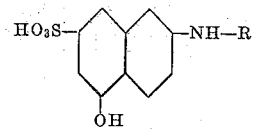

wherein R stands for H, one alkyl, aryl, aralkyl or acidyl radical, with agents yielding chromium, which products, the constitution of which is not known, form dark powders, dyeing animal and vegetable fibres blue to blue-grey and greenish-blue tints.

9. As new products the azo-dyestuffs containing chromium which are obtained by baking dyestuffs containing groups capable of being chromed, agents yielding chromium and alkali metal salts, which products, the constitution of which is not known, form dark powders, dyeing animal and vegetable fibers yellow to orange to redbrown to black to blue to blue-grey and greenish-blue tints.

10. As new products the azo-dyestuffs containing chromium which are obtained by baking dyestuffs containing groups capable of being chromed, agents yielding chromium, alkali metal salts and glycerine, which products, the constitution of which is not known, form dark powders, dyeing animal and vegetable fibers yellow to orange to redbrown to black to blue to blue-grey and greenish-blue tints.

11. As new products of azo-dyestuffs containing chromium which are obtained by baking dyestuffs containing groups capable of being chromed, agents yielding chromium and glycerine, which products, the constitution of which is not known, form dark powders, dyeing animal and vegetable fibers yellow to orange to redbrown to black to blue to blue-grey and greenish-blue tints.

12. As a new product the azo-dyestuff containing chromium which is obtained by baking the dyestuff from diazotized 5-nitro-4-chloro-2-amino-1-phenol and 2-(4'-methyl)-phenylamino-5-hydroxynaphthalene-7-sulfonic acid and of the formula

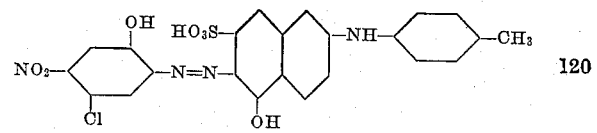

chromium acetate and glycerine, which product, the constitution of which is not known, forms a blackish-bronze powder which dissolves sparingly in water to a blue solution, freely in dilute sodium carbonate solution or caustic soda solution to a greenish-blue solution, and in concentrated sulfuric acid to a blue-violet solution, dyeing cotton in a neutral or feebly alkaline bath greenish-blue tints.

In witness whereof we have hereunto signed our names this 7th day of August, 1928.

FRITZ STRAUB.
HANS MAYER.
WALTER ANDERAU.